US011405681B2

(12) United States Patent
Greene

(10) Patent No.: US 11,405,681 B2
(45) Date of Patent: *Aug. 2, 2022

(54) APPARATUS, SYSTEMS AND METHODS FOR TRICK FUNCTION VIEWING OF MEDIA CONTENT

(71) Applicant: DISH Technologies L.L.C., Englewood, CO (US)

(72) Inventor: Gregory Greene, Littleton, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,046

(22) Filed: Sep. 18, 2020

(65) Prior Publication Data

US 2021/0006857 A1    Jan. 7, 2021

Related U.S. Application Data

(63) Continuation of application No. 14/717,190, filed on May 20, 2015, now Pat. No. 10,805,668.

(51) Int. Cl.
| | |
|---|---|
| *H04N 21/433* | (2011.01) |
| *H04N 21/422* | (2011.01) |
| *G11B 27/00* | (2006.01) |
| *H04N 21/431* | (2011.01) |
| *H04N 21/439* | (2011.01) |
| *G11B 27/10* | (2006.01) |

(52) U.S. Cl.
CPC ....... *H04N 21/4333* (2013.01); *G11B 27/005* (2013.01); *G11B 27/102* (2013.01); *H04N 21/42204* (2013.01); *H04N 21/4316* (2013.01); *H04N 21/4396* (2013.01)

(58) Field of Classification Search
CPC ............ H04N 21/218; H04N 21/4222; H04N 21/4333; H04N 21/44004; H04N 21/6587; H04N 21/42204; H04N 21/4316; H04N 21/4396; G11B 27/005; G11B 27/102
USPC .......................................................... 725/89
See application file for complete search history.

(56) References Cited

U.S. PATENT DOCUMENTS

| | | |
|---|---|---|
| 6,588,015 B1 | 7/2003 | Eyer et al. |
| 7,032,177 B2 | 4/2006 | Novak et al. |
| 7,797,064 B2 | 9/2010 | Loomis et al. |
| 7,877,766 B1 | 1/2011 | Wu et al. |
| 8,223,975 B2 | 7/2012 | Marko |

(Continued)

OTHER PUBLICATIONS

SnaptuneOne (2006). Getting Started with Snaptune One—ADS Instant FM Music Edition.

*Primary Examiner* — Nnenna N Ekpo
(74) *Attorney, Agent, or Firm* — Perkins Coie LLP

(57) ABSTRACT

Systems and methods provide presentation control of media content. An exemplary embodiment receives media content that is currently received in a broadcasted media content stream; presents on a display a first presentation area, wherein the first presentation area presents a video portion of the media content; receives a user command that initiates a video presentation trick function; and presents in response to the user command a second presentation area, wherein the second presentation area presents the video portion of the media content in accordance with the video presentation trick function, and wherein the first presentation area and the second presentation area are concurrently presented on the display.

10 Claims, 2 Drawing Sheets

(56) References Cited

U.S. PATENT DOCUMENTS

| | | |
|---|---|---|
| 8,855,796 B2 | 10/2014 | Otsuka et al. |
| 8,880,723 B1 | 11/2014 | Emerson, III |
| 2003/0020832 A1 | 1/2003 | Carlsgaard et al. |
| 2003/0023973 A1 | 1/2003 | Monson et al. |
| 2004/0168185 A1* | 8/2004 | Dawson .................. H04N 5/45 725/38 |
| 2005/0249080 A1 | 11/2005 | Foote et al. |
| 2006/0048184 A1 | 3/2006 | Polinski et al. |
| 2007/0154168 A1 | 7/2007 | Cordray et al. |
| 2008/0002938 A1 | 1/2008 | Osborne |
| 2008/0005773 A1 | 1/2008 | Ikeda |
| 2008/0152299 A1 | 6/2008 | Ubillos |
| 2009/0083816 A1 | 3/2009 | St. John-Larkin |
| 2009/0228922 A1 | 9/2009 | Haj-Khalil et al. |
| 2009/0307731 A1 | 12/2009 | Beyabani |
| 2010/0107193 A1 | 4/2010 | Manthoulis et al. |
| 2012/0272185 A1 | 10/2012 | Dodson et al. |
| 2013/0024880 A1 | 1/2013 | Moloney-Egnatios et al. |
| 2013/0090752 A1 | 4/2013 | Jellison, Jr. et al. |
| 2013/0309986 A1 | 11/2013 | Cox et al. |
| 2013/0346865 A1* | 12/2013 | Yuan ................ H04M 1/72427 715/720 |
| 2014/0118616 A1 | 5/2014 | Oughriss et al. |
| 2014/0259079 A1* | 9/2014 | Hall .................. H04N 21/4147 725/68 |
| 2016/0080829 A1 | 3/2016 | Biber |
| 2016/0345053 A1 | 11/2016 | Greene |

\* cited by examiner

APPARATUS, SYSTEMS AND METHODS FOR TRICK FUNCTION VIEWING OF MEDIA CONTENT

CROSS-REFERENCE TO RELATED APPLICATION

This application is a continuation of U.S. patent application Ser. No. 14/717,190, filed on May 20, 2015, entitled "APPARATUS, SYSTEMS AND METHODS FOR TRICK FUNCTION VIEWING OF MEDIA CONTENT," incorporated herein by reference in its entirety.

BACKGROUND

When a user is viewing and listening to the media content, various video presentation trick functions are available to the user to control presentation of the media content. An example video presentation trick function is a "pause" function, wherein the current presentation time of the video content is paused. That is, presentation of the stream of video content (serial presentation of a series of video frames, wherein each video frame is presented for a brief predefined duration of time) is halted when a pause operation is initiated. During the pause operation, a currently presented video frame or a selected video frame is shown on the display of the TV for an indefinite duration. When the user ends the pause operation, presentation of the video resumes. During the pause operation, the corresponding audio portion is also halted such that when the pause operation is ended, presentation of the audio content resumes in synchronism with presentation of the video content.

Another video presentation trick function is the "rewind" function. With a rewind function, previously presented video frames are re-accessed from a buffer or other storage medium, and are presented in a backward manner on the display of the TV. That is, the user sees a backward or reverse presentation of the video content. During such rewind operations, the audio portion is halted such that when the video rewind operation ends. When the rewind operation is concluded, the current presentation time of the video and audio content resumes in synchronism at the point in the media content stream corresponding to the time that the rewind operation was ended by the user.

The speed at which the rewind presentation is made may vary based on the configuration of the media device and/or selection by the user. For example, a slow motion rewind operation may be selected by the user wherein the backward presentation of the retrieved video frames presents a slow speed presentation (slower than normal speed presentation) of the video content. Alternatively, a fast rewind operation may be selected by the user wherein the backward presentation of the retrieved video frames is a fast speed presentation (faster than normal speed presentation) of the video content.

Yet another video presentation trick function is a "jump back" function, wherein previously presented video content is again presented beginning at some predefined duration back in time. Here, a previously presented video frame is accessed from the buffer. The accessed video frame is selected based upon some predefined duration, such as one or more minutes, several seconds, or the like. Thus, when this jump back operation is initiated by the user, the current presentation time of the video content is simply repeated at a point identified by the predefined duration. During the jump back operation, the current presentation time of the audio content also jumps back by a corresponding duration so as to resume in synchronism with presentation of the video content.

In the event that some duration of the processed audio/visual content which precedes the currently presented audio/visual content has been stored in the buffer or other storage medium, one or more forward presentation operations may be available to the user. For example, if the user has previously paused presentation of the audio/visual content by five minutes, then approximately five minutes of processed audio/visual content that has not yet been presented will be stored in the buffer or other storage medium. Alternatively, or additionally, a rewind function may have been previously performed such that a corresponding duration of previously presented audio/visual content is stored in the buffer. Accordingly, the user may fast forward through the audio/visual content so that a higher speed presentation of the video content is provided. During the fast forward presentation operation, the audio portion is halted such that when the fast forward operation is ended, presentation of the audio content also resumes in synchronism with presentation of the video content.

Another video presentation trick function is the "jump forward" operation wherein a portion of the video content is skipped over (not presented) by some predefined duration. Here, a stored video frame that is ahead of a currently presented video frame is accessed from the buffer. The current presentation time then continues beginning with the accessed video frame such that a portion of the video content between the currently presented frame and the accessed video frame is simply not presented. The accessed video frame is selected based upon some predefined duration, such as some or more minutes, several seconds, or the like. During the jump forward operation, presentation of the audio content is also advanced by the corresponding duration so as to resume in synchronism with presentation of the video content.

The above-described video presentation trick functions provide satisfactory user-selectable functions for presentation of audio/visual content because the user performing these various operations is able to immediately view the video content. That is, the user receives immediate visual feedback when they initiate one or more of the above described audio/visual content trick functions. For example, the user may want to fast forward through a commercial, advertisement, or the like using the fast forward function, the jump forward function, or a combination thereof. The user immediately understands if they have advanced presentation of the audio/visual content sufficiently far enough so that they may avoid presentation of the commercial. Once the commercial has been passed over, the user may operate their media device to resume presentation of the video content.

However, the above-described video presentation trick function for rewinding back through, or moving forward through, the current presentation time of the media content is limited in that presentation of the media content changes in accordance with the particular selected video presentation trick function. For example, if the user initiates a rewind operation, the media content is presented to the user in real time in a reverse direction. When the user terminates the rewind operation, playback of the media content resumes at the current presentation time that the media content was rewound back to.

However, the user is not able to immediately return to the point in the presentation of the media content that was being presented prior to the start of the rewind operation. Further, if the user wishes to return to the point in presentation at which the video presentation trick function was initiated, the user must use another video presentation trick function to advance the presentation time, hopefully to the desired initial point in presentation.

Further, some significant event in the stream of received media content may have occurred while the user was using a video presentation trick function. For example, the user may be viewing a sporting event being broadcast in real time. During the operation of the rewind trick function and the subsequent viewing of the rewound media content by the user, a significant play in the sporting event may have occurred (which was included in the real time broadcast media content). However, the user would not be viewing that real time content since they would be currently viewing content after the rewind trick function was implemented. Eventually, they might be able to view the significant play (assuming that they did not initiate another video presentation trick function, such as a jump forward trick function, that might otherwise advance presentation past the significant play).

Legacy video presentation trick functions have improved the viewing experience of the user. However, such video presentation trick functions may be frustrating to use, particularly in view that the trick functionality results in the change in current presentation time of the media content event. Accordingly, there is a need in the arts to provide enhanced video presentation trick functions in media devices to further enhance the user's viewing experience.

SUMMARY

Systems and methods of presentation control of media content are disclosed. An exemplary embodiment receives media content that is currently received in a broadcasted media content stream; presents on a display a first presentation area, wherein the first presentation area presents a video portion of the media content; receives a user command that initiates a video presentation trick function; and presents in response to the user command a second presentation area, wherein the second presentation area presents the video portion of the media content in accordance with the video presentation trick function, and wherein the first presentation area and the second presentation area are concurrently presented on the display.

BRIEF DESCRIPTION OF THE DRAWINGS

Preferred and alternative embodiments are described in detail below with reference to the following drawings.

DETAILED DESCRIPTION

Figure 1:
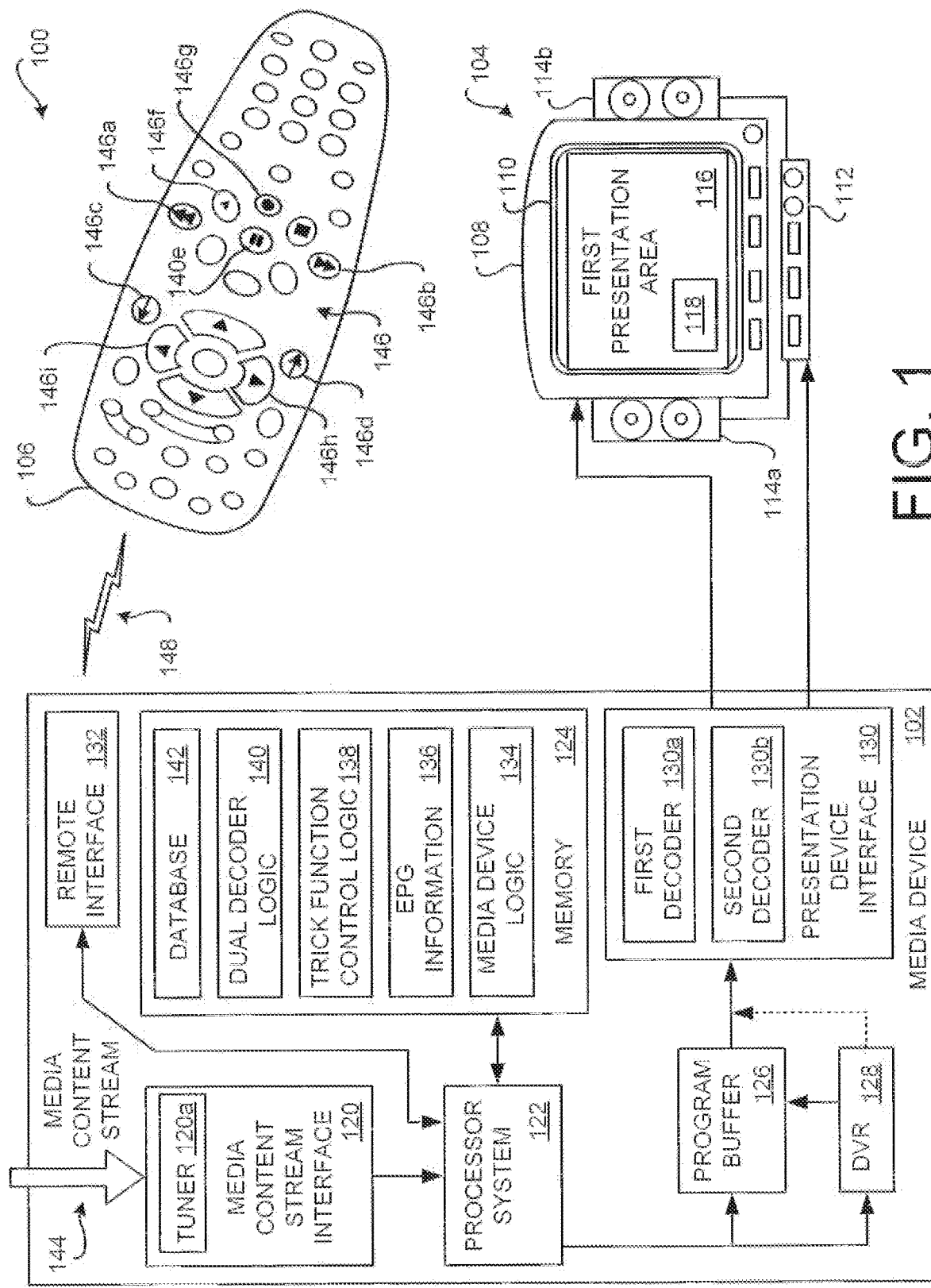
FIG. 1 is a block diagram of an embodiment of the media content presentation system.

FIG. 1 is a block diagram of an embodiment of the trick function presentation system 100. The example trick function presentation system 100 is provisioned in an example media device 102 that is configured to present audio/visual content and/or audio-only content using a media content presentation system 104. A remote control 106 is included that is configured to control operation of the media device 102, and optionally, to control one or more of the components of the media content presentation system 104.

The media content presentation system 104 includes a visual display device 108, such as a television (hereafter, generically a TV) with a display 110 that presents the video content, if present, to the user. The media content presentation system 104 further includes an audio presentation device (APD) 112, such as a surround sound receiver controlling one or more audio reproduction devices (hereafter, generically, speakers 114a, 114b) that are emitting sound corresponding to the audio portion of the presented media content. Other types of output devices may also be coupled to the media device 102, including those providing any sort of stimuli sensible by a human being, such as temperature, vibration and the like. The video portion of the presented media content is displayed on the display 110 and the audio portion of the media content is reproduced as sounds by one or more speakers 114a, 114b. In some embodiments, the media device 102 and one or more of the components of the media content presentation system 104 may be integrated into a single electronic device.

Prior to an initiation of a video presentation trick function by the user (not shown), the video portion of the media content event is presented on the display 110. Typically, the entirety of, or a substantial portion of, the viewing field of the display 110 is used for presentation of the video portion of the media content event.

In response to initiation of a video presentation trick function, the two presentation areas 116, 118 are concurrently generated and are presented on the display 110. That is, embodiments of the trick function presentation system 100 are configured to enter into a dual video presentation mode that includes two presentation areas that present different video content. In an example embodiment, a first presentation area 116 and one or more second presentation areas 118 are currently presented on the display 110.

In a non-limiting example embodiment, the first presentation area 116 is a continued presentation the video portion of the currently received media content event. The size of the first presentation area 116 is the same as, or is substantially the same as, the viewing field of the display 110 that was used for presentation of the video portion of the media content event prior to initiation of the video presentation trick function. However, the size of the first presentation area 116 may be different. That is, presentation of at least the video portion of the currently received media content continues "as if" no video presentation trick function has been initiated. Associated audio content may be optionally presented.

The second presentation area 118 presents a video portion that is being controlled by the initiated video presentation trick function. For example, but not limited to, a rewind operation, a jump back operation, a jump forward operation, a fast forward operation, or a pause operation may be initiated by the user. Audio content is preferably omitted for the video presentation trick function controlled portion of the media content event. Furthermore, the video portion under trick control may be controlled in accordance with a series of different video presentation trick functions. That is, once operation of a first video presentation trick function has been completed, other video presentation trick functions may then be used to further control presentation of the video content shown in the second presentation area 118.

Preferably, the size of the second presentation area 118 is relatively small. In an example embodiment shown in FIG. 1, the second presentation area 118 is presented using a picture over picture format. That is, the second presentation area 118 is presented over, and thus blocks from view, a covered portion of the first presentation area 116. In the various embodiments, any suitable size may be used for the second presentation area 118. Additionally, or alternatively, presentation of the second presentation area 118 may be at any suitable location on the display 110.

Additionally, or alternatively, any suitable presentation format may be used for presentation of the first presentation area 116 and the second presentation area 118. For example, the first presentation area 116 and the second presentation area 118 may be adjacent to each other and not overlap with each other, such as, but not limited to, a side-by-side presentation format. The sizes of the first presentation area 116 and the second presentation area 118 may be the same, or may be different, depending upon the configuration of the particular embodiment.

In an example embodiment, a set up menu may be presented to the user at some earlier time. The set up menu permits the user to predefine the format used to present the first presentation area 116 and the presented one or more second presentation areas 118. The user may then select one of a plurality of different available presentation configurations. For example the user may select a first presentation size for the first presentation area 116, and a second presentation size and/or a location for the second presentation area 118. The user may select presentation using a picture over picture format wherein the smaller second presentation area 118 is presented over a portion of the first presentation area 116, or may select another format such as a side-by-side presentation format. Further, the set up menu may be further configured to present a sample viewing of the first presentation area 116 and the one or more second presentation areas 118 so that the user can preview their presentation format choice. When a trick operation is then later initiated by the user, presentation of the media content event and the associated video presentation trick function is made in accordance with the previous user selection.

Embodiments of the trick function presentation system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event.

The non-limiting exemplary media device 102 comprises a media content stream interface 120, a processor system 122, a memory 124, a program buffer 126, an optional digital video recorder (DVR) 128, a presentation device interface 130, and a remote interface 132. The memory 124 comprises portions for storing the media device logic 134, the electronic program guide (EPG) information 136, the trick function control logic 138, the optional dual decoder logic 140, and the optional database 142. In some embodiments, the video media device logic 134, the trick function control logic 138, and/or the dual decoder logic 140 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 144. Generally, two different types of media content are communicated in the broadcast-format media content streams 144, audio/visual content and audio-only content.

The first type of media content is the audio/visual content. The audio/visual content includes a video content portion and an audio content portion. Typically, the audio/visual content further includes a stream of metadata (control and/or supplemental information) and an optional stream of closed captioning information (text corresponding to the audio dialogue and/or audio commentary of the audio/visual content). Non-limiting examples of this first type of media content are movies, television programming, sporting events, news casts, documentaries, or the like. The video content comprises a series of serially presented video frames when, when presented on the display 110 for a short duration, are perceived by a viewing user as a motion picture. Typically, audio/visual content presents a thematically-based story. The audio content may include dialogue spoken by actors shown in the video content, commentary by other individuals, sound effects, and/or music. The associated audio content, and the optional closed captioning content if selected by the user for presentation, are synchronously presented with the video content.

The second type of media content is defined herein as audio-only content. The audio-only content includes a series of serially presented songs. When a currently playing song has concluded, the next song in the stream of audio-only content is then presented. The series of songs are often provided with no, or at least very few and/or short duration, intervening non-musical segments. Preferably, each newly presented song is performed by a different artist. In contrast to audio/visual content, presentation of the songs in the audio-only content is not thematic based. That is, presentation of the series of songs does not present a story line.

Preferably, visual content is absent from the stream of audio-only content. However, some audio-only content may include limited visual content, such as textual information about a currently presented song (such as the artist's name, the song title, the album name, the song label, the song recording date, etc.) and/or one or more still images (such as a photograph of the song artist or some object that is a subject of the song) and/or a short video relating to the song.

In an example embodiment, multiple media content streams 144 with audio/visual content and/or audio-only content may be multiplexed together in one or more transport channels. The transport channels with the media content streams 144 are communicated to the media device 102 from a media system sourced from a remote head end facility (not shown) operated by the media content provider. Non-limiting examples of such media systems include satellite systems, cable system, and the Internet. For example, if the media content provider provides the media content stream 144 via a satellite-based communication system, the media device 102 is configured to receive one or more broadcasted satellite signals detected by an antenna (not shown). Alternatively, or additionally, the media content stream 144 can be received from one or more different sources, such as, but not limited to, a cable system, a radio frequency (RF) communication system, or the Internet. The media content stream 116 may be alternatively received from an external device, such as a digital video disk (DVD) player, compact disk (CD) player, a flash memory medium, or another suitable memory medium device that stores media content.

The one or more media content streams 144 are received by the media content stream interface 120. In a broadcast environment, one or more tuners 120a in the media content stream interface 120 selectively tune to one of the media content streams 144 in accordance with instructions received from the processor system 122. The processor system 122, executing the media device logic 134 and based upon a request for a media content event of interest specified by a user (not shown), parses out media content associated with the specified media content event of interest.

The media content event of interest, which may be an individual audio/visual content event or an individual audio-only content event (i.e., a song), is then assembled into a stream of video and/or audio information which may be stored by the program buffer 126. The program buffer 126 temporarily stores the received processed media content events. Such buffers are typically configured to store several minutes, or even longer durations, of the processed audio/visual content. The buffered (temporarily stored) media content can then be communicated out from the program buffer 126 as a continuous uninterrupted stream of media content to the components of the media content presentation system 104, such as the visual display device 108 and/or the audio presentation device 112, via the presentation device interface 130. Alternatively, or additionally, the parsed out media content may be saved into the DVR 128 for later presentation. The DVR 128 may be directly provided in, locally connected to, or remotely connected to, the media device 102. In alternative embodiments, the media content streams 144 may be stored for later decompression, processing and/or decryption.

From time to time, information populating the EPG information 136 portion of the memory 124 is communicated to the media device 102, via the media content stream 144 or via another suitable media. The EPG information 136 stores the information pertaining to the scheduled programming of media content events. The information may include, but is not limited to, a scheduled presentation start and/or end time, a program channel, and descriptive information. The media content event's descriptive information may include the title of the media content event, names of performers or actors, date of creation, and a summary describing the nature of the media content event. Any suitable information may be included in the supplemental information. Upon receipt of a command from the user requesting presentation of an EPG menu, the information in the EPG information is retrieved, formatted, and then presented on the display 110 as an EPG menu (not shown). In an example embodiment, the set up menu to configure the presentation formats of the first presentation area 116 and the second presentation area(s) 118 may be accessed via the EPG.

The exemplary media device 102 is configured to receive commands from a user via a remote control 106. The remote control 106 includes one or more controllers 146 disposed on the surface of the remote control 106. The user, by actuating one or more of the controllers 146, causes the remote control 106 to generate and transmit commands, via a wireless signal 148, to the media device 102. Preferably, each individual one of the controllers 146 has a specific predefined function that causes a specific operation by the media device 102 and/or by components of the media content presentation system 104. The commands communicated from the remote control 106 then control the media device 102 and/or control components of the media content presentation system 104. The wireless signal 148 may be an infrared (IR) signal or a radio frequency (RF) signal that is detectable by the remote interface 132.

The processes performed by the media device 102 relating to the processing of the received media content stream 144 and communication of a presentable media content event to the components of the media content presentation system 104 are generally implemented by the processor system 122 while executing the media device logic 134. Thus, the media device 102 may perform a variety of functions related to the processing and presentation of one or more media content events received in the media content stream 144. For example, the processor generates the first presentation area 116 and the second presentation area(s) 118 that are presented on the display 110.

The simplified conceptual presentation device interface 130 includes at least two decoders 130a, 130b. The decoders 130a, 130b are configured to access the media content (the audio and/or video content) stored in the program buffer 126, the DVR 128, or another media medium. The decoders 130a, 130b process the media content and then communicate the accessed media content as a continuous uninterrupted stream of media content to the components of the media content presentation system 104. Accordingly, if there are gaps, missing parts, and/or delays in the receipt of the media content data residing in the media content stream received at the media content stream interface 120, such gaps, missing parts, and/or delays in the communicated data do not interfere with presentation of the media content to the user.

In embodiments that include the dual decoders 130a, 130b, the first decoder 130a may access the video portion of the currently presented media content from the program buffer 126, the DVR 128, or other media medium. The accessed first video portion is processed by the first decoder 130a so that the accessed first video content is presented on the display 110 in the first presentation area 116.

Concurrently, the corresponding audio portion of the media content is accessed from the program buffer 126, the DVR 128, or other media medium. The accessed audio portion is processed by the first decoder 130a so that the first audio portion is synchronously presented by component of the media content presentation system 104, such as the example speakers 114a, 114b.

Prior to initiation of a trick function operation by the user, only the video content and audio content being processed by the first decoder 130a is being presented by components of the media content presentation system 104. In practice, any suitable point in time of the currently presented media content event may be accessed for presentation by the first decoder 130a. For example, the media content event may be currently presented in real time, wherein the currently received media content event in the received media content stream 144 is processed and stored in the program buffer 126, and then is accessed by the first decoder 130a as soon as the media content is available from the program buffer 126 for presentation in a continuous uninterrupted stream of media content.

Alternatively, depending upon prior trick function operations by the user, a previously received portion of the media content event which has been stored in the program buffer 126 may be currently accessed from the program buffer 126 by the first decoder 130a and then presented to the user. For example, the user may have previously paused presentation for some duration. During the pause operation, the currently received media content data in the media content stream 144 is processed and stored in the program buffer 126. When the pause operation was ended by the user, presentation of the media content event resumes from that paused point in time. However, the program buffer 126 has accumulated an amount of media content, corresponding to the duration of the pause operation, which will then be accessed by the first decoder 130*a* and then presented in due course to the user.

Similarly, if the media content has been previously stored in the DVR 128 or other media medium, the first decoder 130*a* may access the media content and process the accessed media content for presentation by the components of the media content presentation system 104. Here, since the media content event has already been received and/or stored in the DVR 128 or other media medium, the first decoder 130*a* is able to access the media content event at any point in time.

In the various embodiments, in response to the user initiating a video presentation trick function operation, the first decoder 130*a* continues to access and process the media content event. That is, the trick function operation is not implemented by the first decoder 130*a*. Rather, the user-initiated trick function operation is implemented by the at least one second decoder 130*b*. The second decoder 130*b* accesses and processes the media content event in accordance with the trick function operation, and presentation of at least the video portion of the media content event is presented using the second presentation area 118.

For example, the user may initiate a rewind function operation. The first decoder 130*a* continues presentation of the media content at the normal presentation speed in the first presentation area 116. Concurrently, the second decoder 130*b* then begins to access the media content event at the point in presentation time that the rewind operation was initiated. The second decoder 130*b* then begins processing of the accessed media content event in accordance with the rewind operation such that the rewinding video portion is presented in the second presentation area 118. Accordingly, the user views the continuing normal speed presentation of the video content portion of the media content event in the first presentation area 116 from the first decoder 130*a*, and concurrently views the rewinding video portion of the media content event in the second presentation area 118 from the second decoder 130*b*. (Alternatively, the first decoder 130*a* may continue to present the continuing normal speed presentation of the media content event in the second presentation area 118 while the rewinding portion of the media content event being managed by the second decoder 130*b* is presented in the first presentation area 116.)

Preferably, the user hears the audio portion of the normal speed presented video content which is being shown (presented) in the first presentation area 116. As noted above, the audio portion of a rewinding media content event, when rewinding at either a fast rewind speed or a slower rewind speed, is not generally intelligible to the user. Accordingly, the audio portion of the corresponding rewinding video portion is muted, halted or otherwise is not presented.

At some point in time, the user ends the rewind function being managed by the second decoder 130*b*. For example, after some duration of rewinding, the user may have rewound the media content event to a previous point in time that the user was interested in seeing again. Then, normal speed presentation of the rewound video and audio content in the second presentation area 118 begins by the second decoder 130*b*. Accordingly, the user is able to view and listen to the rewound portion of the media content event in the second presentation area 118.

In an example embodiment, after the rewind function ends and normal speed presentation of the rewound media content begins to be shown in the second presentation area 118, presentation of the video and audio content in the first presentation area 116 is paused by the first decoder 130*a*.

The audio content of the rewound portion may then be presented. Accordingly, the user does not miss any presentation of the video and audio content shown in the first presentation area 116.

In an example alternative presentation format, after the rewind operation is concluded, the video and audio portions of the rewound portion of the media content event may be presented in the first presentation area 116 at normal speed using the second decoder 130*b*. Concurrently, the paused first portion of the media content event (which continued at normal speed presentation until the end of the rewind operation, at which point in time is then paused) is concurrently moved from the first presentation area 116 to the second presentation area 118. Thus, the user is still able to see the paused portion (without audio) in the second presentation area 118 while they are viewing and listening to the rewound portion of the media content event that is now being presented in the first presentation area 116 by the second decoder 130*b*. (Or, alternatively, presentation formats of the first presentation area 116 and/or the second presentation area 118 may be changed to different sizes and/or locations.)

Another example alternative presentation format is to immediately present the rewinding video in the first presentation area 116 using the second decoder 130*b*. Concurrently, the continuing normal speed presentation of the media content event is moved to the second presentation area 118. When the rewind operation concludes so that presentation of the video and audio of the rewound portion begins in the first presentation area 116, the paused current portion of the media content event (which continued at normal speed presentation until the end of the rewind operation, at which point in time is then paused) remains shown in the second presentation area 118. Thus, the user is still able to view the paused portion (without audio) shown in the second presentation area 118 while they are viewing and listening to the rewound portion of the media content event that is now being presented in the first presentation area 116 by the second decoder 130*b*. (Or, alternatively, presentation formats of the first presentation area 116 and/or the second presentation area 118 may be changed to different sizes and/or locations.)

Alternatively, an example embodiment may simply end presentation of the paused current portion of the media content event (which continued at normal speed presentation until the end of the rewind operation). Here, the second presentation area 118 is closed (discontinued), and the rewound portion of the media content event is shown in the first presentation area 116. In this example embodiment, the first decoder 130*a* may continue to manage the pausing of the media content event for some predefined duration, may continue to manage the pausing of the media content event until another trick operation is initiated using the first decoder 130*a* (since the second decoder 130*b* is now presenting the rewound portion of the media content event at a normal presentation speed), and/or may discontinue accessing and processing the media content event.

Another example video presentation trick function is the jump back operation. Here, previously presented video content is accessed by the second decoder 130*b*. The previously presented video content (with no audio) is again presented beginning at some predefined duration back in time using the second presentation area 118. Thus, when the jump back operation is initiated by the user, the current presentation of the video and audio content continues in the first presentation area 116 while the user is viewing the jumped-back portion of the media content event shown in the second presentation area 118.

Alternatively, the audio of the jumped-back portion may be presented to the user while the audio of the current portion of the media content event is muted, halted or otherwise is not presented. Thus, when the jump back operation is initiated by the user, the current presentation of the video content (no audio content) continues in the first presentation area 116 while the user is viewing and listening to the jumped-back portion of the media content event shown in the second presentation area 118.

Alternatively, the jumped-back portion (video and optionally audio) may be presented to the user using the first presentation area 116. Thus, when the jump back operation is initiated by the user, the current presentation of the video content (no audio content) being managed by the first decoder 130a continues in the second presentation area 118 (with or without audio) while the user is viewing and listening to the jumped-back portion of the media content event shown in the first presentation area 116 by the second decoder 130b. Alternatively, the current presentation of the video content (no audio content) may be paused and the still image may be shown in the second presentation area 118 (audio) while the user is viewing and listening to the jumped-back portion of the media content event shown in the first presentation area 116. (Or, alternatively, presentation formats of the first presentation area 116 and/or the second presentation area 118 may be changed to different sizes and/or locations.)

Yet another video presentation trick function is the fast forward operation. The fast forward operation may be available if some duration of the processed audio/visual content which precedes the currently presented audio/visual content has been stored in the program buffer 126, the DVR 128, or another storage medium. In response to initiation of a fast forward operation, normal speed presentation of the video content being managed by the first decoder 130a continues in the first presentation area 116. Preferably, presentation of audio content of the currently presented media content event also continues. During the fast forward operation, similar to the rewind operation, the video portion of the advancing content portion being managed by the second decoder 130b is shown on the second presentation area 118. Alternatively, the video portion of the advancing content portion being managed by the second decoder 130b may be shown on the first presentation area 116 while the continuing presentation of the media content event is shown in the second presentation area 118. (Or, alternatively, presentation formats of the first presentation area 116 and/or the second presentation area 118 may be changed to different sizes and/or locations.)

Alternatively, the current presentation of the video content may be paused and the still image may be shown in one of the first presentation area 116 or the second presentation area 118, while the user is viewing fast forward presented portion of the media content event shown in the other presentation area. Here, the audio of the fast forward presented content may be optionally presented (since there is no audio from the paused content), even though the audio may be generally unintelligible to the user.

Another video presentation trick function is the jump forward operation. The jump forward operation may be available if some duration of the processed audio/visual content which precedes the currently presented audio/visual content has been stored in the program buffer 126, the DVR 128, or another storage medium. In response to initiation of a jump forward, normal speed presentation of the video content being managed by the first decoder 130a continues in the first presentation area 116. Preferably, presentation of audio content of the currently presented media content event also continues. During the jump forward operation, similar to the jump backward operation, the video portion of the advanced content portion being managed by the second decoder 130b is shown on the second presentation area 118. Alternatively, the video portion of the advanced content portion being managed by the second decoder 130b may be shown on the first presentation area 116 while the continuing presentation of the media content event is shown in the second presentation area 118. The audio content from the advanced portion may optionally replace the audio of the continuing normal speed presentation of the media content event.

A slow motion video presentation trick function may be available to view a slow motion presentation of video content. The video portion of the media content may be presented in either a reverse direction of a forward direction. Here, since the video content is available from the program buffer 126 at the point in time when a slow motion operation is initiated, the forward direction slower presented video content will be immediately available to the second decoder 130b. The second decoder 130b accesses and processes the video content for presentation to the user at the slow motion speed. Slow motion content may be presented in a similar manner to the presentation of fast motion content.

In some instances, the user may wish to pause presentation of the media content event. The paused presentation may continue for some duration until the user ends the pause operation. During the paused presentation, a still image may be shown in the first presentation area 116 (or alternatively, in the second presentation area 118). Normal speed presentation may then continue in the second presentation area 118 (or in the first presentation area 116 if the still image is presented in the second presentation area 118). Here, the user may then optionally initiate a second video presentation trick operation. For example, the user may initiate a jump backward operation, a fast rewind operation, a jump forward operation, a slow motion operation, or other operation of interest. Here, the user is able to pause presentation of the media content event, and then consider which particular video trick function to perform. Further, a series of the same and/or different video presentation trick functions may be performed while presentation of the media content event remains paused in one of the presentation areas 116, 118. For example, the user may initiate a plurality of jump back operations to rewind back through a relatively large portion of previously presented content, and then initiate a fast forward operation to reach particular content of interest. Here, the user need not be concerned about missing any of the content if view of the content pausing while other trick operations are being performed.

In the various embodiments, the video presentation trick functions may be initiated by actuation of one or more of the controllers 146 of the remote control 106. When a particular video presentation trick mode is initiated by actuation of one or more of the controllers 146, the dual presentation of the first presentation area 116 and the second presentation area(s) 118 automatically begins.

For example, a fast forward controller 146a (indicated by right pointing double arrows) is intuitively understood by the user to correspond to a fast forward operation wherein speed of presentation of the video portion is advanced by some predefined speed increment if actuated by the user. Subsequent actuation of that fast forward controller 146a, or actuation of another one of the controllers 146, ends the fast forward operation so that presentation of the video portion resumes at its normal presentation speed. Similarly, the fast rewind controller 146*b* (indicated by left pointing double arrows) is intuitively understood by the user to correspond to a fast rewind operation wherein speed of presentation of the video portion is reversed by some predefined speed increment if actuated by the user. Subsequent actuation of that fast rewind controller 146*b*, or actuation of another one of the controllers 146, ends the fast rewind operation so that presentation of the video portion resumes at its normal presentation speed. Here, buffered video content is accessed from the program buffer 126 at a rate and direction corresponding to the user selected fast forward or fast rewind operation, and is then presented on one of the first presentation area 116 or the second presentation area 118 depending upon configuration of the embodiment. Some embodiments may provide for adjustable fast forward or fast rewind speeds using one or more of the controllers 146.

A jump forward controller 146*c* (indicated by an upward pointing arrow) is intuitively understood by the user to correspond to a jump forward operation wherein presentation of the video portion is advanced by some predefined duration or increment when the associated controller 146*c* is actuated by the user. Similarly, the jump backward controller 146*d* (indicated by a downward pointing arrow) is intuitively understood by the user to correspond to a jump backward operation wherein presentation of the video portion is advanced by some predefined duration or increment when the controller 146*d* is actuated by the user. The amount of the forward jump or reverse jump may be based on a predefined duration (period of time).

The controller 146*e* (indicated by two parallel upward bars) is intuitively understood by the user to correspond to a pause function. Accordingly, if the user actuates the controller 146*e*, presentation of the video and audio portion is paused and a still image is presented on one of the first presentation area 116 or the second presentation area 118. Then, the user may initiate operation of another video presentation trick function.

In some embodiments, a selected controller 146 may be assigned a video image toggle function when the first presentation area 116 and the second presentation area 118 are concurrently presenting video content. For example, the controller 146*f* may be assigned to the video image toggle function. Thus, when controller 146*f* is actuated by the user, presentation of video content on the first presentation area 116 changes to presentation on the second presentation area 118, while the video content presented on the second presentation area 118 then becomes presented on the first presentation area 116.

Alternatively, or additionally, a selectable video image toggle icon or the like may (not shown) be shown on the display 110. The user may use their remote control 106 to navigate to the toggle icon presented on the display 110. When the toggle icon is selected, presentation of video content switches between the first presentation area 116 and the second presentation area 118. (Or, alternatively, presentation formats of the first presentation area 116 and/or the second presentation area 118 may be changed to different sizes and/or locations.) Any suitable form of toggle icon may be used by the various embodiments.

Alternatively, or additionally, another selected controller 146 may be assigned as audio toggle function when the first presentation area 116 and the second presentation area 118 are concurrently presenting video content and audio content for one of the presentation areas 116, 118 is being presented. For example, the controller 146*g* or another controller 146 may alternatively be assigned to an audio toggle function. Thus, when controller 146*g* is actuated by the user, an audible presentation of audio content for the first presentation area 116 changes to an audible presentation of the audio content associated with the video content being presented in the second presentation area 118. Similarly, an audio toggle icon or the like may be shown on the display 110 which the user may select to toggle between audio content.

In some embodiments, a plurality of second presentation areas 118 may be used for presentation of video content using various trick functions. In practice, the multiple second presentation areas 118 enable the user to visually move about the media content event to different points in presentation, and then permit the user to selectively present the media content event as desired. For example, the user may be watching a soccer match on their media content presentation system 104. The user may use a first one of the second presentation areas 118 to rewind and/or jump back to a previous goal, and use another presented one of the second presentation areas 118 to rewind and/or jump back to another previous goal. Then, during less interesting portions of the soccer match, the user may selectively view one or more of the previous goals. The toggle image function could be additionally used so that the viewed previous goal(s) is shown in the larger sized first presentation area 116.

Further, a series of the same or different video presentation trick function could be used to control video presentation in a selected one of the second presentation areas 118 and/or the first presentation area 116. For example, if the user is viewing a particular previous goal made in the soccer match, the user may repeatedly jump back and/or rewind play leading up to that goal as often as desired.

In some situations, the user may be listening to audio-only content that only has limited video content, such as a still image of an album jacket and/or textual information about the song (such as the artist's name, the song title, the album name, the song label, the song recording date, etc.). This limited image and/or text information is readily available from the metadata in the media content stream 144.

When the trick function operations are initiated, one or more of the second presentation areas 118 are presented on the display. In practice, the presented still image and/or text information is associated with the beginning of the particular song that is being identified by the still image and/or text information. The user may then select a particular one of the second presentation areas 118. In response to the user's selection of a particular one of the second presentation areas 118, the song associated with the selected second presentation area 118 begins to be played from its beginning.

In some embodiments, the still image and/or text information of the selected second presentation area 118 is toggled to then become presented in the first presentation area 116. Thus, the user is able to view the still image and/or text information of a currently presented song.

Figure 2:
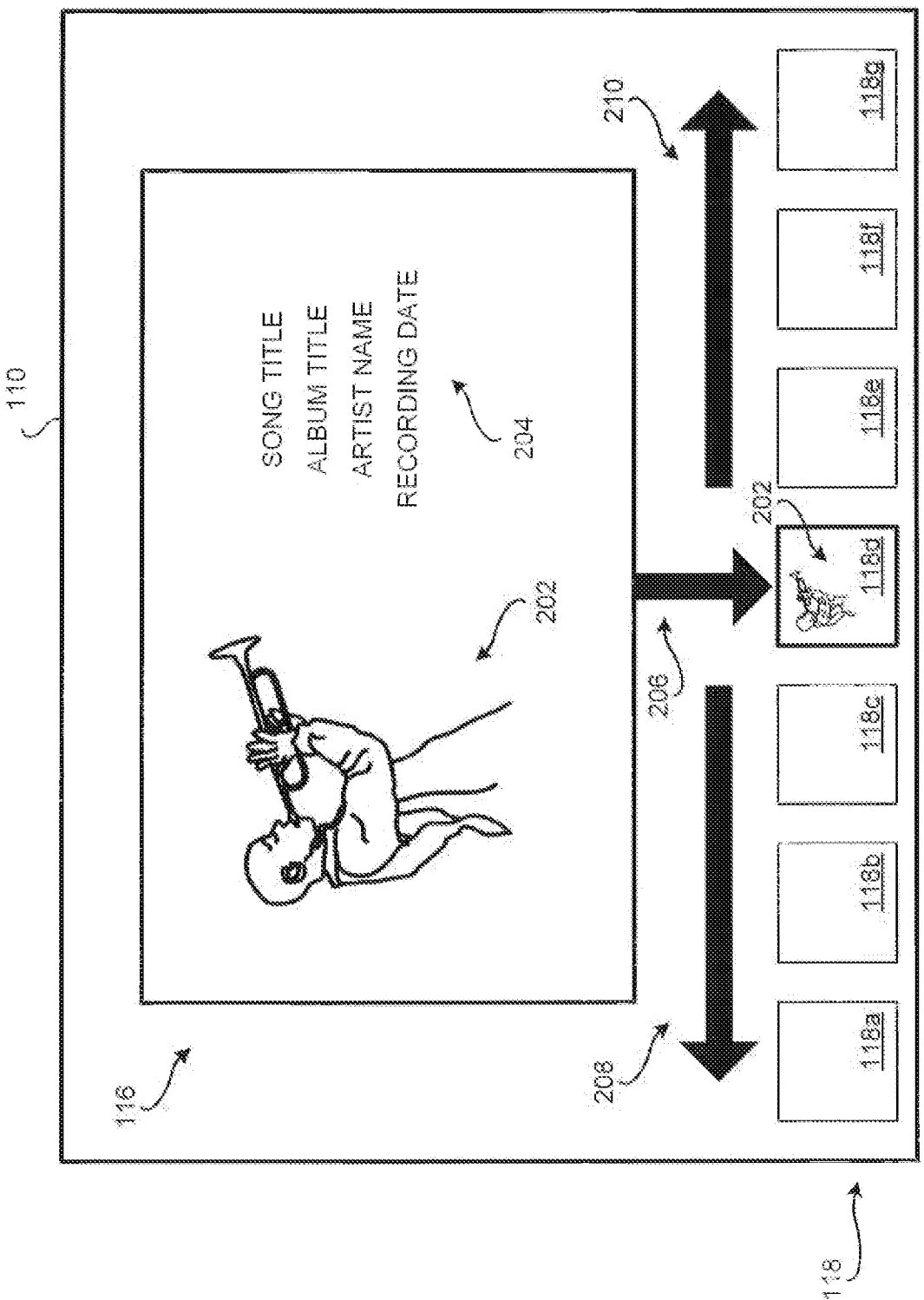
FIG. 2 is a conceptual illustration of a presented first presentation area and a plurality of second presentation areas when audio-only content is being accessed from a media content stream.

FIG. 2 is a conceptual illustration of a presented first presentation area 116 and a plurality of second presentation areas 118 when audio-only content is being accessed from the media content stream 144. A still image 202 of a famous trumpet player and textual information 204 indicating the song title, the album title, the artist name, and the recording date, are presented in the larger sized first presentation area 116. Any suitable video information, defined herein as one or more concurrently and/or serially presented still images, and/or a video clip, may be shown in the first presentation area 116. Here, the user understands that the audio content that is currently being presented (played) by the components of the media content presentation system 104 (FIG. 1) is the song that is associated with the still image, video, and/or text information shown in the first presentation area 116.

Any suitable number of the second presentation areas 118a-118g may be presented on the display 110. Further, any suitable textual information, preferably pertaining to the current song being played, may also be shown in the second presentation areas 118a-118g. Optionally, a smaller sized version of the video information and/or text information may be included in an associated second presentation area 118. That is, based on the second presentation areas 118a-118g, the user views sufficient information to appreciate the nature and/or identity of other songs corresponding to the second presentation areas 118a-118g.

In the example embodiment, the plurality of smaller second presentation areas 118a-118g are shown below the first presentation area 116. In other embodiments, the second presentation areas 118a-118g may be shown in other location on the display 110. Since the currently presented media content comprises a series of individual and discrete songs received in an audio-only content stream, each one of the second presentation areas 118a-118c and 118e-118g is understood by the user to correspond to other songs in the series of songs received in the media content stream 144. Optionally, the second presentation areas 118a-118e may include smaller-sized version of the video information and/or text information for the associated song if available.

The optional downward pointing indicator arrow 206 informs the user that the smaller second presentation area 118d corresponds to the song of the first presentation area 116, which is associated with the current song being played by components of the media content presentation system 104. In an example embodiment, the border around the second presentation area 118d is highlighted to indicate to the user that the song associated with the highlighted bordered second presentation area 118d is the current song being played (and that is shown in the first presentation area 116). Any suitable highlighting may be used by other embodiments. For example, bold and/or colored text font may be used to indicate a highlighted one of the second presentation areas 118a-118g. Additionally, or alternatively, a background shading using a desired color, intensity, and/or pattern may be used to indicate a highlighted one of the second presentation areas 118a-118g.

In the example embodiment, the left pointing indicator arrow 208 indicates to the user that songs associated with the second presentation areas 118a-118c below the indicator arrow 208 are previous songs in the song series. For example, the song associated with the second presentation area 118c is understood by the user to be the previously played song. Similarly, the right pointing indicator arrow 210 indicates to the user that songs associated with the second presentation areas 118e-118g below the indicator arrow 210 are next songs that are to be played in the song series. Assuming that these next songs are available in the program buffer 126, the DVR 128, or other media medium, the information (video information and/or textual information) may be determined and included in the second presentation areas 118e-118g. Alternatively, and if the songs are not yet available in the program buffer 126 since the songs have not yet been received in the media content stream 144, the second presentation areas 118a-118g may be left blank or may be omitted. In some embodiments, a playlist or other information may have been provided to the media device that identifies the next songs to be played in the series of songs. In such instances, the received playlist information may be used to define information that is shown in the second presentation areas 118a-118g.

In an example embodiment, the user's actuation of the controller 146h of their remote control 106 (FIG. 1) will scroll the highlighted border to the next left-adjacent second presentation area 118. Subsequent actuation of the controller 146h, and/or continued actuation of the controller 146h, will further scroll in a left direction to the next adjacent second presentation area 118a-118c (i.e., from 118c to 118b, for example). Similarly, the user's actuation of the controller 146i will scroll the highlighted border to the next right-adjacent second presentation area 118. Subsequent actuation of the controller 146i, and/or continued actuation of the controller 146i, will further scroll in a right direction to the next adjacent second presentation area 118e-118g (i.e., from 118e to 118f, for example).

In the event that the user selects one of the highlighted other second presentation areas 118a-118c, that associated previous song will be accessed from its beginning and then played to the user. That is, since the previous songs are accessible from the program buffer 126, the DVR 128, or other media medium, the songs may be accessed at their beginning and then played to the user. Assuming that one or more of the next songs corresponding to the second presentation areas 118e-118g are available in the program buffer 126, the DVR 128, or other media medium, user selection of one of the highlighted other second presentation areas 118e-118g will cause the associated next song to be accessed from its beginning and then played to the user.

In an example embodiment, the first presentation area 116 may be optionally replaced with the video information and/or text information of the song of the currently highlighted one of the second presentation areas 118a-118c. Thus, as the user scrolls among the second presentation areas 118a-118g, the video information and/or text information of the currently highlighted presentation area is shown in the first presentation area 116 so that the user may more readily appreciate their listening choices.

In some embodiments, as the user actuates the controller 146h to move the highlighted border to the left, a re-positioning of the second presentation areas 118a-118g may occur so that the second presentation areas 118a-118g are each shifted to the right by one space for each actuation of the controller 146h. Similarly, as the user actuates the controller 146i to move the highlighted border to the right, a re-positioning of the second presentation areas 118a-118g may occur so that the second presentation areas 118a-118g are each shifted to the left by one space for each actuation of the controller 146i. In an example embodiment, the changing images of the second presentation areas 118a-118c are changed so as to appear to be moving in a sliding manner across the display 110.

After changing positions of the second presentation areas 118a-118g, one of the second presentation areas 118 will then be shown directly below the indicator arrow 206. For example, one actuation of the controller 146h will shift the video information and/or text information previously shown in the second presentation area 118c to then be shown in the second presentation area 118d. In an embodiment that optionally highlights the border of the new image shown in the second presentation area 118d, the user understands that their selection will change the current song being played to the new song corresponding to the highlighted second presentation area 118d.

In an example embodiment, the image shown on the first presentation area 116 always corresponds to the particular image shown in the second presentation area 118d. In other embodiments, the image of the first presentation area 116 remains constant so long as the current song is playing.

When the current song concludes, the next song is played, and the image shown in the first presentation area 116 changes (here, to the previously shown image of the second presentation area 118*e*).

In practice, the user is able to scroll through available songs and selectively listen to particular songs of interest. An example embodiment is configured to immediately change songs and modify presentation of the first presentation area 116 and the second presentation areas 118*a*-118*g* in response to user selection of a particular one of the second presentation areas 118*a*-118*g*. Alternatively, embodiments may be configured to simply change presentation of the first presentation area 116 to correspond to the presently active (highlighted) one of the second presentation areas 118*a*-118*g*. Presentation of the current song is not yet changed. In response to a subsequent user actuation of another one of the controllers 146, then song play is changed to the song associated with the currently highlighted one of the second presentation areas 118*a*-118*g*. Accordingly, the user may visually preview information about each song prior to initiating presentation of the highlighted song of interest indicated in an active one of the second presentation areas 118*a*-118*g*.

In some embodiments, one or more characteristics of the media content stream is analyzed to determine if the currently presented stream of content is audio/visual content or audio-only content. Alternatively, embodiments may determine whether a channel of the currently presented media content is a type of channel that provides audio/visual content or a type of channel that provides audio-only content. Various processes of differentiating between audio/visual content and audio-only content is disclosed in commonly owned U.S. application Ser. No. 14/717,083, filed on May 20, 2015, and titled "Apparatus, System and Methods For Song Play Using a Media Device Having a Buffer," and which is incorporated by reference herein in its entirety. In the various embodiments, when the trick function presentation system 100 is used to play songs of an audio-only content stream, the format of the display 110 is automatically configured to show the first presentation area 116 indicating the currently played song and to show the second presentation areas 118*e*-118*g* which indicate previously played and next to be played songs in the series of songs. On the other hand, if the trick function presentation system 100 determines that the currently received media content stream, or the associated channel, corresponds to audio/visual content, then the second presentation area 118 is shown when the user initiates a video presentation trick function.

In embodiments that are presenting the first presentation area 116 and the second presentation areas 118*a*-118*g* for audio only content, the first decoder 130*a* is initially operated to access a currently played song for playing in the series of songs. The currently played song may be a song that is currently being received in the media content stream 144, or the currently played song may be an earlier received song that has been stored in the program buffer 126, the DVR 128, or other media medium (and that is being accessed by the first decoder 130*a*).

While the currently played song is being presented, the second decoder 130*b* is sampling stored information in the program buffer 126, the DVR 128, or other media medium to identify the video information and/or text information of previously received songs. The still image, video, and/or text information is preferably available to the second decoder 130*b* from the metadata associated with each song, though the video information and/or text information may be obtained from other sources.

When the still video information and/or text information has been identified for one of the previously received songs, the video information and/or text information is retrieved and is then stored in a suitable database. The database 142 may reside in memory 124. Alternatively, the information of the database 142 may reside in the example EPG information 136, in the program buffer 126, or in another suitable memory medium. Additionally, the database information includes an association of the stored still image, video, and/or text information with its respective song. For example, a unique identifier of the song, such as its title or the like, may be associated with and stored in the database 142 with the video information and/or text information for each song.

Further, location information, such as a pointer or the like, is determined and is then stored in the database 142. The location information identifies the storage location of at least the beginning of each song. Thus, if the user selects a particular song for playing via one of the presented second presentation areas 118*a*-118*g*, the first decoder 130*a* and/or the second decoder 130*b* will have access to the location information necessary to retrieve and play that song, starting at its beginning, from the program buffer 126, the DVR 128, or other media medium.

Then, video information and/or text information for the next previous song is found from continued sampling of the program buffer 126, the DVR 128, or another media medium by the second decoder 130*b*. For example, when the next previous song has been found and its associated video information and/or text information has been identified, the information (along with the song identifier and its storage location information) is then saved into the database 142.

In some situations, intervening non-musical segments may be included between individual songs. Some embodiments may be optionally configured to not generate and present information in one of the second presentation areas 118*e*-118*g* that correspond to the intervening non-musical segments. In such embodiments, the second decoder 130*b* simply discriminates between songs and any intervening non-musical segments, and then omits information pertaining to the identified intervening non-musical segment from the database. However, in some alternative embodiments, the intervening non-musical segments may be of interest to the user, such as when the intervening non-musical segment provides commentary or presents a news story. Such embodiments may identify video information and/or text information for such intervening non-musical segments, and then include that information in a presented second presentation area 118 so that the user may optionally choose to select the intervening non-musical segment for presentation.

When the media content stream 144 has been received for a relatively long duration, many songs will have become identified (and their associated still image, video, and/or text information saved). Accordingly, over time, a plurality of video information and/or text information for each of a series of previously received songs that have been stored in the program buffer 126, the DVR 128, or another media medium, are saved in a database 142. Further, a listing of stored songs in their stored order is stored in the database 142. Thus, when the user navigates about the presented plurality of second presentation areas 118*a*-118*g*, embodiments are able to keep track of the order of songs and then correctly access the video information and/or text information for each song that is indicated in one of the presented second presentation areas 118*a*-118*g*. The accessed video information and/or text information may then be formatted and/or sized to fit within its respective and relatively small second presentation area 118a-118g. If the video information and/or text information is also presented on the first presentation area 116, the information may be sized for and located in the first presentation area 116 accordingly.

In practice, in an example embodiment, the first decoder 130a is initially used to access the currently played song from the program buffer 126, the DVR 128, or other media medium. When one of the second presentation areas 118a-118g becomes highlighted, such as when the user is navigating about the presented second presentation areas 118a-118g, the second decoder 130b accesses or receives from the database 142 the location information for the song that corresponds to the currently highlighted one of the second presentation areas 118e-118g. Accordingly, in the event that the user selects the song identified by the currently highlighted one of the second presentation areas 118e-118g, the second decoder 130b may immediately access that song from its beginning for playing to the user. Then, the operating roles of the first decoder 130a and the second decoder 130b may be switched so that the first decoder 130a now accesses the location information for the next highlighted one of the second presentation areas 118e-118g while the second decoder 130b continues to access the new currently playing song. Then, if the user selects that next highlighted song for playing, the first decoder 130a may immediately access that next song from its beginning. Thus, the process of accessing location information of songs from the database 142 by the non-playing one of the decoders 130a, 130b continues such that songs selected via one of the second presentation areas 118a-118g are more quickly accessed and played.

In the various embodiments, the example decoders 130a, 130b may be implemented as hardware, software or firmware. Further, additional decoders may be included in alternative embodiments. The dual decoder logic 140 may be executed by the processor to manage operation of the decoders 130a, 130b. If the decoders 130a, 130b are implemented as hardware and/or firmware, processor systems (not shown) in the decoders 130a, 130b may cooperatively operate with the processing system 122 to manage video content and audio content presentation in the first presentation area 116 and the second presentation areas 118.

It should be emphasized that the above-described embodiments of the trick function presentation system 100 are merely possible examples of implementations of the invention. Many variations and modifications may be made to the above-described embodiments. All such modifications and variations are intended to be included herein within the scope of this disclosure and protected by the following claims.

I claim:

1. A method for presentation control of media content, the method comprising:
    receiving the media content at a media device;
    presenting a first presentation area, on a display, wherein the first presentation area presents a video portion of the media content;
    receiving, at the media device, a first user command that initiates a video presentation trick function;
    in response to the first user command:
        presenting a second presentation area on the display; and
        presenting a smaller-sized version of the video portion of the media content in the second presentation area in accordance with the video presentation trick function, concurrently with the first presentation area;
    receiving a second user command that ends an operation of the video presentation trick function, wherein the video portion of the media content being presented in the second presentation area is then presented at its normal speed after the operation of the video presentation trick function ends;
    receiving a third user command that pauses presentation of the video portion of the media content in the first presentation area while the video portion of the media content is presented in the second presentation area;
    muting a first audio portion of the media content presented in the synchronism with the video portion of the media content presented in the first presentation area in response to the third user command; and
    audibly presenting a second audio portion of the media content corresponding to the video content being presented in the second presentation area in response to the third user command.

2. The method of claim 1, wherein the first presentation area continues to present the video portion of the media content at its normal presentation speed and size.

3. The method of claim 1, wherein the video presentation trick function is a first video presentation trick function initiated in response to receiving the first user command, the method further comprising:
    receiving a fourth user command that initiates a second video presentation trick function; and
    presenting, in the second presentation area, the smaller-sized version of the video portion of the media content in accordance with the second video presentation trick function.

4. The method of claim 1, further comprising:
    receiving a fourth user command that initiates a video image toggle function, wherein the video portion of the media content presented in accordance with the video presentation trick function is moved from the second presentation area to presentation in the first presentation area, and
    wherein the video portion of the media content is concurrently moved from the first presentation area to presentation of a the smaller-sized version of the video portion of the media content in the second presentation area.

5. The method of claim 1, the method further comprising:
    receiving a fourth user command that selects the second presentation area, moving presentation of the video portion of the media content presented in accordance with the video presentation trick function from the second presentation area to presentation in the first presentation area in response to the fourth user command, and ending presentation of the second presentation area in response to the fourth user command.

6. The method of claim 1,
    wherein receiving the media content comprises:
        processing the received media content; and
        storing the processed media content in a program buffer,
    wherein presenting the video portion of the media content in the first presentation area comprises:
        accessing, using a first decoder, the video portion of the media content presented in the first presentation area from the program buffer, and
    wherein presenting the video portion of the media content in the second presentation area comprises:
        accessing, using a second decoder, the video portion of the media content presented in the second presentation area from the program buffer.

7. A media device, comprising:
a tuner, wherein the tuner is operable to receive a stream of broadcasted media content;
a program buffer,
wherein the program buffer is operable to store the received media content, wherein the program buffer is further operable to stream out the received media content to a media content presentation system, and
wherein the media content presentation system is operable to present video content portions of the media content on a display and present audio portions of the media content from at least one sound reproducing device;
a processor system communicatively coupled to the tuner and the program buffer, wherein the processor system is operable to:
generate a first presentation area, wherein the first presentation area presents a first video portion of the media content on the display;
receive a first user command that initiates a video presentation trick function;
in response to the first user command:
modify the video portion of the media content in accordance with the video presentation trick function;
generate a second presentation area; and
present the video portion of a smaller-sized version of the media content in the second presentation area in accordance with the video presentation trick function,
wherein the first presentation area and the second presentation area are concurrently presented on the display;
wherein the processor system is further operable to receive a second user command that pauses presentation of the video portion of the media content in the first presentation area while the video portion of the media content is presented in the second presentation area,
wherein a first audio portion of the media content previously presented in synchronism with the video portion of the media content presented in the first presentation area is muted in response to the second user command, and wherein a second audio portion of the media content corresponding to the video content being presented in the second presentation area is audibly presented in response to the second user command;
a first decoder that is operable to present the video portion of the media content in the first presentation area; and
a second decoder that is operable to present the smaller-sized version of the media content in accordance with the video presentation trick function in the second presentation area.

8. The media device of claim 7,
wherein the video presentation trick function is a first video presentation trick function initiated in response to receiving a first user command,
wherein the processor system is further operable to receive a third user command that ends an operation of the first video presentation trick function;
wherein the processor system is further operable to receive a fourth user command that initiates a second video presentation trick function,
wherein the second decoder then presents the smaller-sized version of the video portion of the media content in accordance with the second video presentation trick function in the second presentation area, and
wherein the first decoder continues presentation of the video portion of the media content in the first presentation area.

9. The media device of claim 7,
wherein the video presentation trick function is a first video presentation trick function initiated in response to receiving the first user command,
wherein the processor system is further operable to receive a third user command that ends an operation of the first video presentation trick function;
wherein the processor system is further operable to receive a fourth user command that initiates a second video presentation trick function,
wherein the second decoder then presents the video portion of the media content in accordance with the second video presentation trick function in the first presentation area, and
wherein the first decoder continues presentation of the video portion of the media content in the second presentation area.

10. The media device of claim 7,
wherein the video presentation trick function is a first video presentation trick function initiated in response to receiving a first user command,
wherein the processor system is further operable to receive a third user command that initiates a video image toggle function,
wherein the video portion of the media content presented in accordance with the video presentation trick function is moved from the second presentation area to presentation in the first presentation area in response to the third user command, and
wherein the video portion of the media content is concurrently moved from the first presentation area to presentation in the second presentation area in response to the third user command.

* * * * *

UNITED STATES PATENT AND TRADEMARK OFFICE
CERTIFICATE OF CORRECTION

| | |
|---|---|
| PATENT NO. | : 11,405,681 B2 |
| APPLICATION NO. | : 17/026046 |
| DATED | : August 2, 2022 |
| INVENTOR(S) | : Gregory Greene |

It is certified that error appears in the above-identified patent and that said Letters Patent is hereby corrected as shown below:

In the Claims

In Claim 1, Column 20, Line 10, after "content" insert --previously--;
In Claim 1, Column 20, Line 12, after "in" delete "the".

Signed and Sealed this
Fourth Day of October, 2022

Katherine Kelly Vidal
*Director of the United States Patent and Trademark Office*